United States Patent
Malloy et al.

(10) Patent No.: US 9,137,136 B2
(45) Date of Patent: Sep. 15, 2015

(54) OVERHEAD MANAGEMENT FOR EVENT TRACING

(75) Inventors: Patrick Malloy, Washington, DC (US); Peter Anthony Crosby, Edmond, OK (US); Robert Meagher, Greenfield, NH (US)

(73) Assignee: RIVERBED TECHNOLOGY, INC., San Francisco, CA (US)

( * ) Notice: Subject to any disclaimer, the term of this patent is extended or adjusted under 35 U.S.C. 154(b) by 125 days.

(21) Appl. No.: 13/365,496

(22) Filed: Feb. 3, 2012

(65) Prior Publication Data

US 2013/0145015 A1 Jun. 6, 2013

Related U.S. Application Data

(60) Provisional application No. 61/439,658, filed on Feb. 4, 2011.

(51) Int. Cl.
*G06F 15/173* (2006.01)
*H04L 12/26* (2006.01)
*G06F 11/34* (2006.01)
*H04L 29/08* (2006.01)

(52) U.S. Cl.
CPC ............ *H04L 43/14* (2013.01); *G06F 11/3476* (2013.01); *G06F 11/3495* (2013.01); *H04L 67/025* (2013.01); *G06F 2201/86* (2013.01); *G06F 2201/87* (2013.01); *G06F 2209/508* (2013.01)

(58) Field of Classification Search
CPC .... H04L 12/2603; H04L 43/14; H04L 67/025
USPC ........................................................ 709/224
See application file for complete search history.

(56) References Cited

U.S. PATENT DOCUMENTS

| | | | |
|---|---|---|---|
| 6,775,824 B1 | 8/2004 | Osborne, II et al. | |
| 7,827,539 B1 * | 11/2010 | Wygodny et al. | 717/128 |
| 2004/0078691 A1 * | 4/2004 | Cirne et al. | 714/38 |
| 2004/0148237 A1 * | 7/2004 | Bittmann et al. | 705/35 |
| 2004/0267897 A1 | 12/2004 | Hill et al. | |
| 2005/0223366 A1 * | 10/2005 | Smith et al. | 717/128 |
| 2006/0280119 A1 | 12/2006 | Karamanolis et al. | |
| 2007/0011330 A1 * | 1/2007 | Dinker et al. | 709/226 |
| 2008/0008095 A1 | 1/2008 | Gilfix | |
| 2010/0229218 A1 * | 9/2010 | Kumbalimutt et al. | 726/4 |

(Continued)

OTHER PUBLICATIONS

Invitation to Pay Additional Fees for corresponding International Appl. No. PCT/US2012/023722.

(Continued)

*Primary Examiner* — Yves Dalencourt
(74) *Attorney, Agent, or Firm* — Park, Vaughan, Fleming & Dowler LLP; Laxman Sahasrabuddhe

(57) ABSTRACT

Embodiments provide methods for managing data generated by software transactions, such as event tracing software. In one embodiment, data generated by event tracing software is monitored. The throughput of the data generated may then be modulated based on various criteria, such as a target data rate. The throughput target may be specified on a per-system basis or individual basis. Based on the throughput, the level of detail recorded is modulated. Individual processes may determine a limit or quota depending on their contribution to the throughput. In one embodiment, the method calls for a trace are modified with different property specifications to meet a desired throughput of event tracing data.

19 Claims, 2 Drawing Sheets

(56) References Cited

U.S. PATENT DOCUMENTS

2011/0067008 A1 3/2011 Srivastava et al.
2011/0119523 A1 5/2011 Bisdikian et al.
2013/0205009 A1 8/2013 Malloy et al.

OTHER PUBLICATIONS

International Search Report directed to related International Patent Application No. PCT/US2012/023722, mailed Aug. 6, 2012; 5 pages.

Preliminary Report on Patentability and Written Opinion of the International Search Authority directed to related International Patent Application No. PCT/US2012/023722, mailed Aug. 6, 2013, from the International Bureau of WIPO; 19 pages.

Non-Final Office Action mailed Oct. 16, 2012, for U.S. Appl. No. 13/400,973; 30 pages.

Final Office Action mailed Aug. 5, 2013, for U.S. Appl. No. 13/400,973; 58 pages.

Non-Final Office Action mailed Dec. 4, 2013, for U.S. Appl. No. 13/400,973; 33 pages.

* cited by examiner

OVERHEAD MANAGEMENT FOR EVENT TRACING

CROSS-REFERENCE TO RELATED APPLICATIONS

This application claims the benefit of priority of U.S. Provisional Application No. 61/439,658 filed Feb. 4, 2011, entitled "Overhead Management for Event Tracing Software," which is incorporated by reference in its entirety.

BACKGROUND

Application performance management relates to technologies and systems for monitoring and managing the performance of applications. For example, application performance management is commonly used to monitor and manage transactions performed by an application running on a server to a client.

Today, many applications can be accessed over a network, such as the Internet or intranet. For example, due to the ubiquity of web browsers on most client devices, web applications have become particularly popular. Web applications typically employ a browser-supported infrastructure, such as Java or a .NET framework. However, the performance of these types of applications is difficult to monitor and manage because of the complexity of the software and hardware and numerous components that may be involved.

A transaction typically comprises a sequence of method calls in a program that represent a complete set of operations necessary to perform a self-contained unit of work, such as a web request or a database query. Transactions can be traced to monitor and manage their performance. For example, a trace can be performed in an application server to obtain detailed information about the execution of an application within that server.

In a traditional transaction trace for web applications, Java or .NET instrumentation components are running (on the application server, the client, etc.) and write records of all of the method calls of a transaction to a transaction trace file. Such tracing must be initiated manually or triggered by a program condition and for only a limited period of time. It is necessary to limit trace duration and detail in the conventional systems because the act of tracing is relatively expensive and could negatively impact performance and disk space of the server, the client, etc.

Unfortunately, this means that in many circumstances the execution of an application within a system cannot be diagnosed or monitored.

BRIEF DESCRIPTION OF THE DRAWINGS

The invention is explained in further detail, and by way of example, with reference to the accompanying drawings wherein.

Throughout the drawings, the same reference numerals indicate similar or corresponding features or functions. The drawings are included for illustrative purposes and are not intended to limit the scope of the invention.

DETAILED DESCRIPTION

The embodiments relate to monitoring and managing applications, such as web applications running via the hardware and software in a web infrastructure. In particular, the embodiments provide a framework for tracing as many transactions as possible in real-time. The framework may support continuous tracing, periodic, or on-demand tracing. In one embodiment, whenever possible, the application performance management systems and methods will attempt to trace every call in every transaction. In one embodiment, a throughput manager manages the tradeoff between performance and completeness of detail harvested by the tracing process or continuous tracing process, while maintaining a low overhead and minimizing impact on the system's performance.

In the following description, for purposes of explanation rather than limitation, specific details are set forth such as the particular architecture, interfaces, techniques, etc., in order to provide an understanding of the concepts of the invention. However, it will be apparent to those skilled in the art that the present invention may be practiced in other embodiments, which depart from these specific details.

Certain embodiments of the inventions will now be described. These embodiments are presented by way of example only, and are not intended to limit the scope of the inventions. Indeed, the novel methods and systems described herein may be embodied in a variety of other forms. Furthermore, various omissions, substitutions and changes in the form of the methods and systems described herein may be made without departing from the spirit of the inventions. For example, for purposes of simplicity and clarity, detailed descriptions of well-known components, such as circuits, are omitted so as not to obscure the description of the present invention with unnecessary detail. To illustrate some of the embodiments, reference will now be made to the figures.

Figure 1:
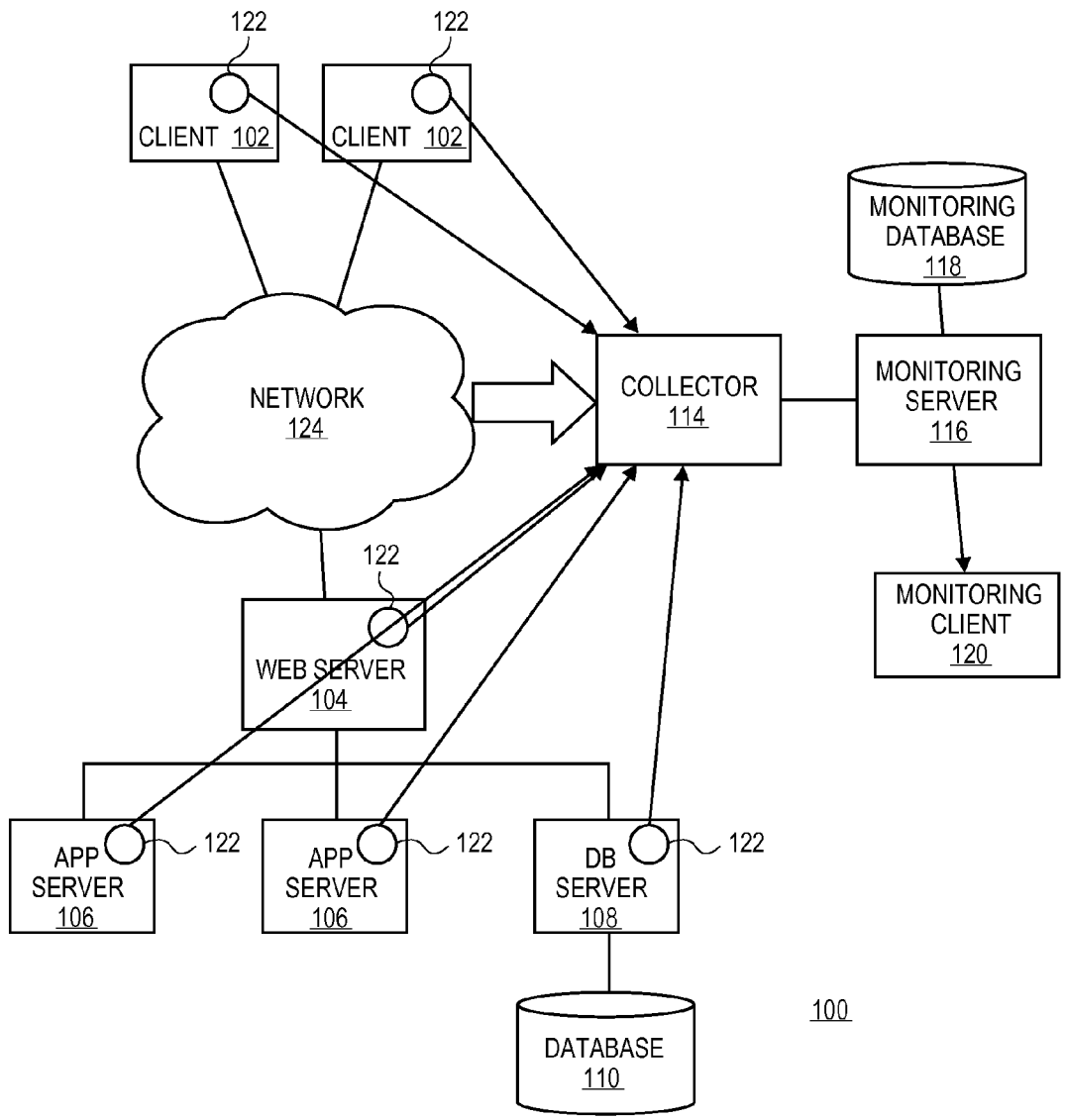
FIG. 1 illustrates an exemplary system in accordance with the principles of the present invention.

FIG. 1 illustrates an exemplary system to support a multi-tier application and an application performance management system. As shown, the system 100 may comprise a set of clients 102, a web server 104, application servers 106, a database server 108, a database 110, and application performance management system 112. The application performance management system 112 may comprise a collector 114, a monitoring server 116, and a monitoring database 118. The application performance management system 112 may also be accessed via a monitoring client 120. These components will now be further described.

Clients 102 refer to any device requesting and accessing services of applications provided by system 100. Clients 102 may be implemented using known hardware and software, such as a processor, a memory, communication interfaces, an operating system, application software, etc. For example, clients 102 may be implemented on a personal computer, a laptop computer, a tablet computer, a smart phone, and the like. Such devices are known to those skilled in the art and may be employed in one embodiment.

The clients 102 may access various applications based on client software running or installed on the clients 102. The clients 102 may execute a thick client, a thin client, or hybrid client. For example, the clients 102 may access applications via a thin client, such as a browser application like Internet Explore, Firefox, etc. Programming for these thin clients may include, for example, JavaScript/AJX, JSP, ASP, PHP, Flash, Siverlight, and others. Such browsers and programming code are known to those skilled in the art.

Alternatively, the clients 102 may execute a thick client, such as a stand-alone application, installed on the clients 102. Programming for thick clients may be based on the .NET framework, Java, Visual Studio, etc.

Web server 104 provides content for the applications of system 100 over a network, such as network 124. Web server 104 may be implemented using known hardware and software, such as a processor, a memory, communication interfaces, an operating system, etc. to deliver application content. For example, web server 104 may deliver content via HTML pages and employ various IP protocols, such as HTTP.

Application servers 106 provide a hardware and software environment on which the applications of system 1000 may execute. In one embodiment, applications servers 106 may be implemented based as Java Application Servers, Windows Server implement a .NET framework, LINUX, UNIX, WebSphere, etc. running on known hardware platforms. Application servers 106 may be implemented on the same hardware platform as the web server 104, or as shown in FIG. 1, they may be implemented on their own hardware.

In one embodiment, applications servers 106 may provide various applications, such as mail, word processors, spreadsheets, point-of-sale, multimedia, etc. Application servers 106 may perform various transactions related to requests by the clients 102. In addition, application servers 106 may interface with the database server 108 and database 110 on behalf of clients 102, implement business logic for the applications, and other functions known to those skilled in the art.

Database server 108 provides database services to database 110 for transactions and queries requested by clients 102. Database server 108 may be implemented using known hardware and software, such as a processor, a memory, communication interfaces, an operating system, etc. For example, database server 108 may be implemented based on Oracle, DB2, Ingres, SQL Server, MySQL, and etc. software running on the server 108.

Database 110 represents the storage infrastructure for data and information requested by clients 102. Database 110 may be implemented using known hardware and software. For example, database 110 may be implemented as relational database based on known database management systems, such as SQL, MySQL, etc. Database 110 may also comprise other types of databases, such as object oriented databases, XML databases, and so forth.

Application performance management system 112 represents the hardware and software used for monitoring and managing the applications provided by system 100. As shown, application performance management system 112 may comprise a collector 114, a monitoring server 116, a monitoring database 118, a monitoring client 120, and agents 122. These components will now be further described.

Collector 114 collects application performance information from the components of system 100. For example, collector 114 may receive information from clients 102, web server 104, application servers 106, database server 108, and network 124. The application performance information may comprise a variety of information, such as trace files, system logs, etc. Collector 114 may be implemented using known hardware and software, such as a processor, a memory, communication interfaces, an operating system, etc. For example, collector 114 may be implemented as software running on a general-purpose server. Alternatively, collector 114 may be implemented as an appliance or virtual machine running on a server.

Monitoring server 116 hosts the application performance management system. Monitoring server 116 may be implemented using known hardware and software, such as a processor, a memory, communication interfaces, an operating system, etc. Monitoring server 116 may be implemented as software running on a general-purpose server. Alternatively, monitoring server 116 may be implemented as an appliance or virtual machine running on a server.

Monitoring database 118 provides a storage infrastructure for storing the application performance information processed by the monitoring server 116. Monitoring database 118 may be implemented using known hardware and software, such as a processor, a memory, communication interfaces, an operating system, etc.

Monitoring client 120 serves as an interface for accessing monitoring server 116. For example, monitoring client 120 may be implemented as a personal computer running an application or web browser accessing the monitoring server 116.

Agents 122 serve as instrumentation for the application performance management system. As shown, the agents 122 may be distributed and running on the various components of system 100. Agents 122 may be implemented as software running on the components or may be a hardware device coupled to the component. For example, agents 122 may implement monitoring instrumentation for Java and .NET framework applications. In one embodiment, the agents 122 implement, among other things, tracing of method calls for various transactions. In particular, in one embodiment, agents 122 may interface known tracing configurations provided by Java and the .NET framework to enable tracing periodically, continuously, or in response to various events and to modulate the level of detail of the tracing.

In one embodiment, the agents 122 may implement or comprise a throughput manager to allow for continuous tracing of the node or entity being monitored, such as clients 102 or application server 106. As noted, conventional tracing on a server, such as application server 106, must be initiated manually or triggered by a program condition and for only a limited period of time. Conventionally, it is considered necessary to limit trace duration and detail because the act of tracing is relatively expensive and could negatively impact performance and disk space of the application server 106.

In contrast, the embodiments permit continuous, rather than intermittent, tracing of an entity. The continuous tracing may be performed for various durations. In addition, in the embodiments, the continuous tracing may be temporarily suspended. However, in one embodiment, the throughput manager in agents 122 may continue to run and re-initiate tracing when system performance allows. For example, in one embodiment, the agents 122 automatically modulate the level of detail written to meet a set of throughput goals set by the user. In one embodiment, the user, for example via monitoring client 122, may set a target data rate, such as in kilobytes per second, and a maximum amount of disk space to be used by agents 122.

In one embodiment, the user-defined target data rate applies communally on a per-system basis to all processes for which continuous tracing has been enabled. Based on the communal rate, the agents 122 may set quotas for the individual contributing processes.

In one embodiment, the amount of data being written communally by agents 122 is measured based on a time interval. For example, the agents 122 may measure the communal data rate every 30 seconds, 1 minute, 2 minutes, etc.

Based on communal data rate measured, the agents 122 may then adjust the level of transaction method call detail written to a transaction trace file to ensure these targets are met. If the current data rate is low enough, the agents 122 allows every detail of each method call, including information tags known as properties. A property is a pair of strings comprising a name and a value. The name of a property derives from a set of strings that identify characteristics, such as method arguments, environment settings at the time of a call, etc., to be associated with each specific method call of a transaction. For example, properties such as SQL statements, database URLs, HTTP methods, etc. may be traced in the embodiments. If, however, the data rate of trace data written by agents 122 becomes excessive, the agents 122 will omit some property details, or even some method call events themselves, from the transaction trace file.

Network 124 serves as a communications infrastructure for the system 100. Network 124 may comprise various known network elements, such as routers, firewalls, hubs, switches, etc. In one embodiment, network 124 may support various communications protocols, such as TCP/IP. Network 124 may refer to any scale of network, such as a local area network, a metropolitan area network, a wide area network, the Internet, etc.

Figure 2:
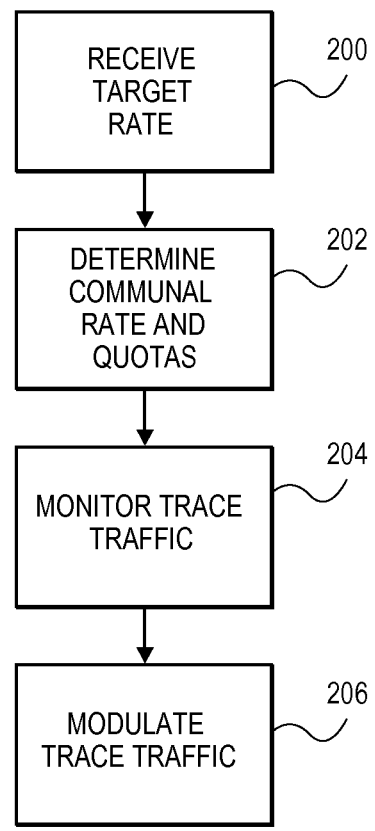
FIG. 2 illustrates an exemplary process flow in accordance with the principles of the present invention.

FIG. 2 illustrates an exemplary process flow for continuous tracing. For purposes of illustration, FIG. 2 provides an example of continuous tracing by an agent 122 monitoring one of applications servers 106. Those skilled in the art will recognize that the continuous tracing by agents 122 may also be employed in other components or portions of the system 100.

Referring now to FIG. 1, in phase 200, the agent 122 receives a target data rate. The target data rate may be provided to the agent 122 via a variety of ways. For example, a user may access monitoring client 120 and specify a desired target data rate for continuously monitoring one of application servers 106. Monitoring server 118 may then communicate this data rate to agent 122 via network 124. Alternatively, a user may directly access agent 122 locally, for example, on application server 106 via a command interface or other interface provided by agent 122.

In phase 202, the agent 122 determines a communal data rate and quotas based on the target data rate for various processes running on the application server 106. In one embodiment, the agent 122 may divide the communal data rate in various ways to determine individual quotas for the processes. For example, the agent 122 may divide the communal data rate evenly among the current processes running on application server 106. Alternatively, the agent 122 may individually set different quota rates for different processes based on their characteristics, such as process type, duration, etc.

In phase 204, the agent 122 monitors the data rate consumed, such as traffic level, by the processes in relation to their quota for tracing. For example, the agent 122 may monitor CPU time or cycles, number of bytes written to disk space, and the like.

In phase 206, the agent 122 modulates the level of detail written by the individual processes for tracing. In one embodiment, the agent 122 employs a token-bucket algorithm based on a process quota to modulate the level of detail written by each individual process depending on its traffic level. The token-bucket algorithm is a mechanism that monitors some rate of resource usage or data transfer. The bucket is initially holding a specific number of tokens.

Each time a defined quantum of a resource is used (such as a number of bytes written to a disk, or number of CPU cycles used to process data) during a fixed period, a token is removed from the bucket. Each time a resource is not used during the same period, a token is added to the bucket, until the token count is restored to its initial level.

Accordingly, the number of tokens remaining in the bucket fluctuates between zero and a maximum, such as the initial number assigned. In one embodiment, agent 122 can use the percentage of tokens remaining compared to the initial number of tokens as a level of activity or throughput regulator.

At the start of each interval, the throughput manager of the agent 122 uses the current bucket token count at the start of the interval to compute a threshold value, for example, from 0 to 10, where 0=all tokens present in the bucket, and 10=no tokens present in the bucket. In other words, these values represent a percentage of the maximum number of tokens that remain in the bucket, truncated to the nearest 10 percent.

In one embodiment, the agent 122 assigns each of the values from 0 to 10 two filter values, a number and a set of properties. The number and the property set are used by the agent 122 to restrict the amount of detailed information about each method call that is to be written to the trace file during the period, until the next threshold value is computed at the start of the next period.

If the data rate is too high, such as fewer tokens are available in the bucket, the throughput manager in agent 122 omits lower duration method calls. Properties, which are name-value pairs such as SQL statements, database URLs, etc., may also be omitted if the data rate is excessive. Thus, the agent 122 can continuously determine a detail level based on the quota and traffic level.

For purposes of illustration, a simplified example is provided below showing the bucket divided into three levels, such as 0, 5, and 10. For level 0, there is no minimum method duration, and thus, the agent 122 traces all method calls.

As also shown, three possible properties, A B and C may be specified by the agent 122 to indicate an allowable level of detail. In the simplified example shown, property A is always written to a trace. Property B, however, is written for levels 0 through 5, and property C is only written for level 0.

| Throughput Level | Minimum call duration | Properties to write |
| --- | --- | --- |
| 0 | 0 (all calls may be written) | A, B, C |
| 5 | 5 microseconds | A, B |
| 10 | 20 microseconds | A |

When agent 122 restricts the data written in any given period of time, the trace traffic of the processes is thus lowered, and the token bucket maintained by agent 122 replenishes tokens, eventually permitting more data to be written in future periods.

When modulating the data rate, in one embodiment, the agent 122 may enforce a stepped policy that omits method calls and calls to children based on call duration versus current throughput level. For method calls that are permitted to be written, the subset of associated property name-value pairs is also selected from a set that is defined for each throughput level. In other words, in one embodiment, each data filtering or permitted detail output level corresponds to a minimum call duration and the set of property-value pairs to include. The highest detail level includes all items. In one embodiment, the lowest level of detail may correspond to various levels that minimize impact to system performance. For example, the lowest level of detail may correspond to tracing being temporarily suspended.

In other embodiments, the agent 122 may enforce other policies to ensure compliance with the communal data rate. For example, the agent 122 may throttle the one or more processes, cap the data rate of one or more processes, and the like. The throughput manager in agent 122 may implement any form of scheduling and policing algorithm.

In one embodiment, to permit a consumer of the transaction trace file to observe the effects of modulating the detail level, the agent 122 may write the current detail level to the trace file when it changes.

The foregoing merely illustrates the principles of the invention. It will thus be appreciated that those skilled in the art will be able to devise various arrangements which, although not explicitly described or shown herein, embody the principles of the invention and are thus within its spirit and scope. Other system configuration and optimization features will be evident to one of ordinary skill in the art in view of this disclosure, and are included within the scope of the following claims.

The features and attributes of the specific embodiments disclosed above may be combined in different ways to form additional embodiments, all of which fall within the scope of the present disclosure. Although the present disclosure provides certain embodiments and applications, other embodiments that are apparent to those of ordinary skill in the art, including embodiments, which do not provide all of the features and advantages set forth herein, are also within the scope of this disclosure. Accordingly, the scope of the present disclosure is intended to be defined only by reference to the appended claims.

What is claimed is:

1. A method of modulating an amount of a resource used by a trace process running on an application server to record transaction data, the method comprising:
receiving a target data rate, wherein the target data rate is a rate at which the transaction data is desired to be recorded by the trace process, and wherein the target data rate is specified as an amount of data per unit time;
determining, by a processor, a quota for each application process in a plurality of application processes based on the target data rate, wherein determining the quota comprises individually setting different quota rates for different application processes based on at least a type and duration of each application process; and
for each application process in the plurality of application processes,
determining, by the processor, the amount of the resource used by the trace process to record transaction data associated with the application process; and
modulating, by the processor, a level of detail written by the trace process based on the amount of the resource used by the trace process in relation to the quota associated with the application process.

2. The method of claim 1, wherein receiving the target data rate comprises receiving a requested data rate from a user.

3. The method of claim 1, wherein determining the quota for the application process in the plurality of application processes comprises determining the quota for a number of bytes written to a storage.

4. The method of claim 1, wherein determining the quota for the application process in the plurality of application processes comprises determining the quota for a number of processor cycles.

5. The method of claim 1, wherein determining the quota for the application process in the plurality of application processes comprises determining a maximum amount of storage space that may be used by the trace process.

6. The method of claim 1, wherein modulating the trace process comprises modulating method calls traced by the trace process.

7. The method of claim 1, wherein modulating the trace process comprises tracing method calls traced by the trace process having a minimum call duration.

8. The method of claim 1, wherein modulating the trace process comprises tracing method calls traced by the trace process having a set of selected properties.

9. The method of claim 1, further comprising:
running a plurality of application processes comprising the trace process; and
determining a communal data rate for the plurality of application processes based on the received target data rate,
wherein determining the quota further comprises determining a corresponding quota for each application process in the plurality of application processes based on the determined communal data rate.

10. The method of claim 9, wherein determining the quota further comprises evenly dividing the communal data rate among the plurality of application processes.

11. An application server configured to trace a transaction serviced by the application server and modulate a resource consumed by tracing the transaction, the application server comprising:
a processor;
an application process, executed by the processor, configured to perform the transaction;
a trace process, executed by the processor, configured to record trace information related to the transaction;
a storage configured to store the trace information recorded by the trace process; and
a throughput manager, executed by the processor, configured to:
receive a requested limit for the trace process, the requested limit being a rate at which the trace information is desired to be recorded to the storage, and wherein the requested limit is specified as an amount of data per unit time,
determine a quota for the application process based on the requested limit, wherein determining the quota comprises individually setting different quota rates for different application processes based on at least a type and duration of each application process, and
modulate a level of detail written by the trace process based on the resource of the application server consumed by the trace process in relation to the quota associated with the application process.

12. The application server of claim 11, wherein the throughput manager is configured to determine the quota for a number of bytes written by the trace process to the storage.

13. The application server of claim 11, wherein the throughput manager is configured to determine the quota for a number processor cycles used to service the trace process.

14. The application server of claim 11, wherein the throughput manager is configured to determine the quota for a maximum amount of storage space that may be used by the trace process.

15. The application server of claim 11, wherein the throughput manager is configured to modulate method calls traced by the trace process.

16. The application server of claim 11, wherein the throughput manager is configured to trace method calls having a minimum call duration.

17. The application server of claim 11, wherein the throughput manager is configured to trace method calls having a set of selected properties.

18. A method for modulating an amount of data recorded for a transaction on an application server, the method comprising:
running a plurality of application processes, one of the plurality of application processes executing the transaction;
monitoring a data activity rate, wherein the data activity rate is a rate at which the data for the transaction is recorded, wherein the data activity rate is specified as an amount of data per unit time, and wherein said monitoring comprises:
   removing a token from a token bucket each time a resource is used during a fixed period, and
   adding a token to the token bucket each time a resource is not used during a fixed period;
determining, by a processor of the application server, a throughput level based on the monitored data activity rate, wherein the throughput level is associated with a minimum call duration and a set of property types, and wherein the throughput level is computed based on a number of tokens currently in the token bucket and an initial number of tokens that were present in the token bucket;
determining a quota for each application process in the plurality of application processes based on the determined throughput level, wherein determining the quota comprises individually setting different quota rates for different application processes based on at least a type and duration of each application process;
selecting, by the processor, a method call and a property based on the determined throughput level; and
recording, by the processor, the selected method call and the selected property based on the throughput level.

19. The method of claim 18, further comprising:
increasing a level of detail of the recording based on the monitored data activity rate being less than the determined throughput level; and
decreasing the level of detail of the recording based on the monitored data activity rate being greater than the determined throughput level.

\* \* \* \* \*